United States Patent [19]
Vallomy

[11] Patent Number: 6,004,504
[45] Date of Patent: Dec. 21, 1999

[54] METHOD AND APPARATUS FOR CONTROLLING BATH LEVEL AND MEASUREMENT OF BATH CHARACTERISTICS

[75] Inventor: John A. Vallomy, Charlotte, N.C.

[73] Assignee: Techint Compagnia Tecnica Internazionale, Milan, Italy

[21] Appl. No.: 09/041,348

[22] Filed: Mar. 12, 1998

[51] Int. Cl.[6] .............................. C21C 1/04; C21D 11/00; C21B 7/24; F27D 3/00
[52] U.S. Cl. ................................ 266/79; 75/382; 75/386; 75/387; 266/88; 266/94; 266/99; 373/81
[58] Field of Search .................................. 266/94, 99, 78, 266/88, 225, 79; 373/79, 81; 75/375, 382, 386, 387

[56] References Cited

U.S. PATENT DOCUMENTS

| | | | |
|---|---|---|---|
| 5,507,854 | 4/1996 | Yamada et al. | 75/387 |
| 5,513,206 | 4/1996 | Mori et al. | 373/80 |
| 5,788,921 | 8/1998 | Gitman et al. | 266/225 |

*Primary Examiner*—Prince Willis
*Assistant Examiner*—Tima McGuthry-Banks
*Attorney, Agent, or Firm*—Dougherty & Associates

[57] ABSTRACT

A method and apparatus for improved control of continuous electric arc furnace steelmaking in which a charge velocity detector measures charge velocity of metallic charge introduced to the furnace. A charge mass detector measures a charge mass of metallic charge introduced to the furnace. A computer determines a feed rate based on the charge velocity and the charge mass. An automatic bath level probe detects a steel bath. The computer determines a steel bath level and optimal positions to insert a temperature probe and an oxygen lance, and further predicts new bath levels from one tapping time to the next tapping time. The temperature probe is inserted to an optimal measurement position based on the steel bath level and measures a steel bath temperature. The oxygen lance is positioned and maintained at an optimal oxygen injection position and injects oxygen into the bath.

16 Claims, 3 Drawing Sheets

METHOD AND APPARATUS FOR CONTROLLING BATH LEVEL AND MEASUREMENT OF BATH CHARACTERISTICS

FIELD OF THE INVENTION

This invention relates generally to controlling bath level and measurement of bath characteristics in a continuous steelmaking process and, in particular, to controlling the bath level and measurement of bath level and temperature in an electric steelmaking process.

BACKGROUND TO THE INVENTION

Continuous steelmaking is particularly advantageous in those regions where there is a concentration of production, or ready availability of metallic charge, and where electric energy is both available and economical.

The operation of an electric arc steelmaking furnace can be an intermittent operation, wherein the sequence followed is: charging of steel scrap and/or direct reduced iron, pig iron, slag formers and alloying elements; ignition or establishment of an electric arc between the electrodes in the furnace to create melting conditions for melting the charge and forming a molten metal bath covered by a foamy slag; refining for a period of time during which the molten metal portion of the bath is refined to form steel having a desired composition and quality; and periodically raising the electrodes to remove them from contact with the bath and interference with the tapping procedure; and then tapping the molten metal.

In the steelmaking practice, "continuous charging" or "continuous melting" refer to charging practices in which charge materials are fed to a furnace during the charging, melting and refining periods, then charging and power input is interrupted for the tapping procedure. An electric arc steelmaking furnace can be operated continuously without interruption by charging or power input for the tapping procedure. The term "metallic charge" as used herein means material for continuous melting, including ferrous scrap, pig iron and direct reduced iron in pellet or briquette form. In continuous operation, metallic charge is preheated and continuously fed to the furnace. A foaming slag practice may be used so that the furnace is only partially tapped intermittently without removal of the electrodes. Thus, the electrodes remain at full power during continuous feeding, refining and tapping.

In the continuous steelmaking process, as well as in all steelmaking processes, control of the steel content is desirable to manufacture different compositions and qualities of steel. Control of carbon content and iron content in steel is typically accomplished by selecting specific grades of metallic charge to be fed into the furnace as well as by introduction of pure material.

Accurate measurement and control of the bath temperature is desirable to maintain optimum melting conditions as well as to use energy efficiently in the steelmaking process. Measuring the bath temperature on a periodic and continuous basis is important to avoid steel bath overcooling or overheating. Manual measurements of bath temperature may produce inaccurate and unreliable temperatures because of inconsistent placement of temperature measuring instruments. Although manual measurements of steel bath temperature can be used in the continuous steelmaking process, more accurate and reliable steel bath temperature measurements are preferred.

Providing a steel bath level that is neither too low nor too high is also important to maintain the steelmaking process in a continuous mode. In particular, maintaining an appropriate heel level (i.e., minimum level of molten metal in the furnace) containing available heat results in immediate melting of metallic charge. Accurate determination of the steel bath level further allows for proper placement of sensing equipment and material injectors in relation to the steel bath level.

Accurate measurement of the steel bath level allows for control of steel production. Measuring the steel bath level may be accomplished by visual inspection, or estimated based on the amount of metallic charge introduced to the furnace (i.e., the metallic charge feed rate). The metallic charge feed rate may be determined by: weighing each load of metallic charge; measuring the change in position of the loading crane along the charge conveyor; estimating a metallic charge velocity based on the change in position of the loading crane; and calculating the metallic charge feed rate based on the weighed metallic charge and the estimated metallic charge velocity. Although the metallic charge feed rate may be determined as described above, a more accurate and simpler determination of metallic charge feed rate is desirable. Determining accurate feed rate is particularly important to control the bath level in a continuous steelmaking process.

Although this invention is shown and described in connection with an electric arc steelmaking furnace, it will be readily apparent that any electric powered steelmaking furnace, including, but without limitation, plasma furnaces and induction furnaces, could be substituted for the electric arc steelmaking furnace with like results.

The method and apparatus of the present invention is particularly well suited for use in the continuous steelmaking process described in my U.S. Pat. Nos. 4,543,124 and 4,609,400.

SUMMARY OF THE INVENTION

The present invention is a method for improved control of a continuous steelmaking process by detecting the mass and the velocity of charge materials introduced to a furnace, determining a feed rate of material entering the furnace, determining the steel bath level in the furnace, storing the bath level data and the feed rate, predicting a new bath level, determining optimal positions based on the predicted bath level to insert and place probes and lances, measuring the steel bath temperature with a temperature probe at an optimal position, positioning an oxygen lance and a carbon lance at optimal positions and injecting oxygen and carbon into the bath.

Further, the present invention is an apparatus for improved control of a continuous steelmaking process having an electric arc furnace containing a molten metal bath. The apparatus includes a conveyor to transfer metallic charge to the furnace, a charge velocity detector for detecting the speed of charge movement, a charge mass detector for detecting metallic charge density, a computer for determining charge feed rate, a steel bath level and optimal positions for inserting or positioning probes or lances, a measuring probe removably insertable into the bath for detecting bath level and bath temperature, and a plurality of lances removably positionable in the bath to inject oxygen and carbon.

OBJECTS OF THE INVENTION

A principal object of the present invention is to improve control of the continuous steelmaking process in response to the feed rate of charge material and the bath level.

Another object of the present invention is to accurately determine the level of the steel bath and efficiently determine the optimum feed rate of charge material.

Another object of the present invention is to accurately determine the level of the steel bath covered with a foamy slag of unknown and varying thickness and consistency with a sensor.

Another object of the present invention is to determine optimal positions of probes and lances in the steel bath.

Another object of the present invention is to obtain accurate and reliable temperature measurements of the steel bath.

Another object of the present invention is to create and maintain a homogenous steel bath.

Another object of the present invention is to regulate oxygen injection into the steel bath.

BRIEF DESCRIPTION OF THE DRAWINGS

The foregoing and other objects will become more readily apparent by referring to the following detailed description and the appended drawings in which.

DETAILED DESCRIPTION

While the method and apparatus of the present invention are described for an electric arc steelmaking furnace, this is merely for convenience of explanation and not intended to limit the scope of the invention disclosed herein. The present invention applies to any steelmaking system using an electric furnace.

Figure 1:
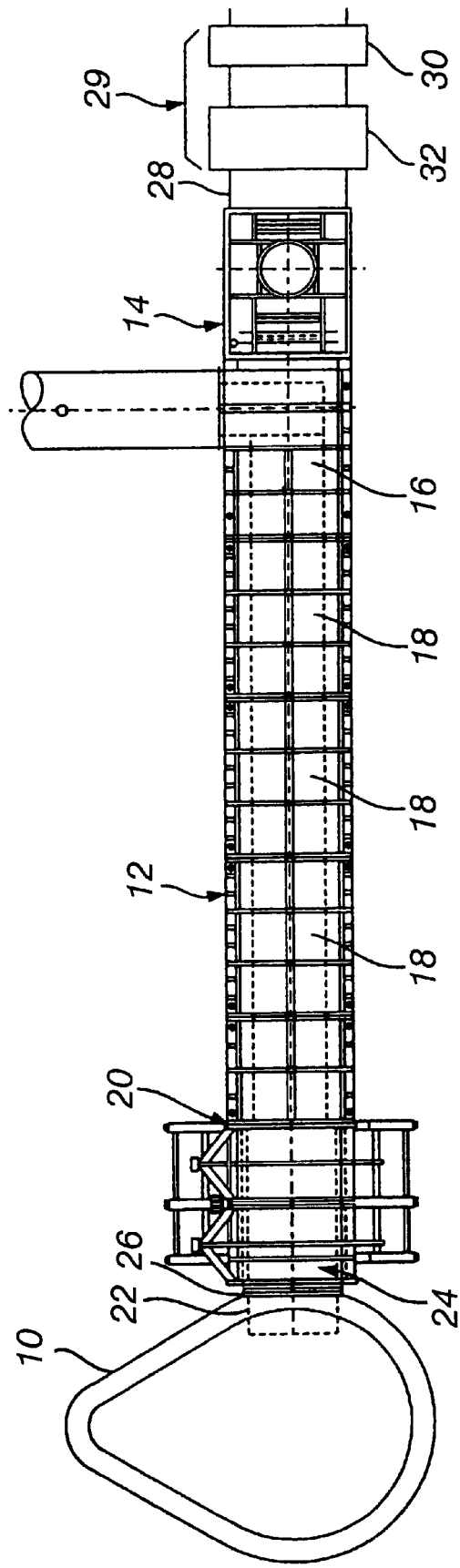
FIG. 1 is a schematic representation in plan view of an apparatus for controlling a continuous steelmaking process in accordance with the present invention.

Referring now to the drawings, FIG. 1 is a schematic representation in plan view of an apparatus for controlling a continuous steelmaking process in accordance with the present invention. An electric arc steelmaking furnace 10 has an associated elongated preheating chamber 12, such as a vibrating channel, for introducing charge materials, both metallics and nonmetallics, into the furnace 10. The furnace 10 can be a three-phase electric arc furnace, a direct current electric furnace, a plasma furnace or an induction furnace. The preheating chamber 12, also known as a "preheater", has an elongated support covered by a mating elongated hood, preferably refractory-lined, and generally in accordance with that illustrated and described in U.S. Pat. No. 4,609,400, the disclosure of which is incorporated herein by reference. The preheating chamber 12 has a dynamic seal 14 at the charge material entry end generally in accordance with that illustrated and described in U.S. Pat. No. 5,406,579, the disclosure of which is incorporated herein by reference. From the charge material entry end, the preheating chamber 12 includes sequentially a gas transition section or zone 16, one or more heating sections or zones 18, and a material discharge section 20. Furnace 10 has an off-gas exit orifice 22. The discharge section 20 of the preheating chamber 12 is mounted on a connecting car 24 for telescoping axial movement into engagement with the furnace opening 26 which effectively seals the stationary chamber 12 to the furnace 10, the latter which may be a tiltable furnace. The connecting car 24 feeds the metallic charge from the preheater to the furnace at the proper location within the furnace. The connecting car 24 is advantageously mounted on a track. The dynamic seal 14 receives charge material from a charge conveyor 28. Vibrating conveyors are preferably used so that the metallic charge moves towards the furnace 10 in a series of discrete shuffling segments.

A feed rate detector 29 is located upstream from the dynamic seal 14, prior to entry to the furnace 10, and in view of the charge conveyor 28. The feed rate detector 29 comprises a charge mass detector 32 and a charge velocity detector 30 that measure the mass and the velocity, respectively, of the metallic charge introduced to the furnace by the conveyor 28. A computer (not shown) is electronically connected to the feed rate detector 29 to receive mass and velocity measurements from the feed rate detector. The computer is preferably electrically connected to the charge mass detector 32 and the charge velocity detector 30 to receive measured mass and velocity, respectively from the charge mass detector and the charge velocity detector.

The charge mass detector 32 is preferably a radiation emitter/receiver device similar to commercial medical or security x-ray machines based on electromagnetic radiation having extremely short wavelength. The charge mass detector 32 has a radiation emitter positioned over the conveyor surface. A radiation receiver is positioned underneath the conveyor surface and vertically aligned with the radiation emitter enabling the receiver to measure radiation from the emitter. The metallic charge on the conveyor 28 is typically built to a pre-determined height and maintained at that height by an arrestor bar. By exposing metallic charge on the conveyor 28 for a pre-determined period of time with a predetermined dose of radiation, the remaining radiation measured by the charge mass receiver is used to determine the mass of the metallic charge mass and, therefore, metallic charge weight.

The charge mass detector 32 determines an average metallic charge mass based on the measured radiation and the radiation absorbed by the conveyor surface. Radiation absorbed by the conveyor surface is relatively constant and pre-determined to facilitate determination of the average charge mass. As the metallic charge on the conveyor 28 passes by the charge mass detector 32 and is bombarded with a pre-determined dose of radiation, the greater the mass of the metallic charge, the lesser the amount of radiation measured by the receiver. The mass determined by the charge mass detector 32 is then provided to a computer (not shown) which is electrically connected to the charge mass detector 32.

The rate of movement of metallic charge on a vibrating-type conveyor is difficult to ascertain because the vibrating rate of the conveyor contributes to the relative movement of metallic charge towards the furnace. The charge velocity detector 30 is preferably a laser-based device which can make highly accurate measurements using Doppler velocimetry. According to this approach, crests of metallic charge scatter light from one or more coherent light beams with different angles of incidence. A photodetector receives the light and generates a frequency representing the heterodyne difference in Doppler shift frequencies produced by particle motion relative to the beams.

The charge velocity detector 30 may use a single beam laser so that the single beam laser is straddled over the conveyor. More preferably, the charge velocity detector 30 is a twin-beam laser that is positioned to one side and over-looking the conveyor. The charge velocity detector 30 is positioned at a distance from the conveyor 28 to satisfy measuring region requirements. Measuring region requirements generally involve positioning the charge velocity detector 30 at an optimal distance so that crests of the is metallic charge on the conveyor 28 are detected within a measurement region. By activating the laser to obtain hits on crests of the moving metallic charge per unit of time, the charge velocity detector 30 determines the velocity of the metallic charge towards the furnace 10, while compensating for contributions to erroneous velocity by the vibration of the conveyor 28. The metallic charge velocity is then provided to the computer (not shown) where the metallic charge velocity is averaged for a pre-determined period of time.

In an alternative embodiment, the charge velocity detector 30 uses two charge profile sensors that are both positioned to overlook the conveyor 28. In this embodiment, a first charge profile sensor is positioned a pre-determined distance away from a second charge profile sensor. Both of the charge profile sensors are electrically connected to the computer to transmit information regarding the charge characteristics or charge profile detected by each charge profile sensor. The detected charge characteristics include but are not limited to a physical outline of the metallic charge and reflected light characteristics of the metallic charge.

The first charge profile sensor detects a first profile of charge on a section of the conveyor 28 at an initial instant of time. This profile of charge is transmitted from the first charge profile sensor to the computer. The computer stores the detected profile of charge and the initial instant of time. Meanwhile, the second charge profile sensor continuously scans a second section of the conveyor 28 and detects a second profile of charge at a second instant of time. The second profile of charge is transmitted from the second charge profile sensor to the computer, and the computer compares the second profile of charge with the first profile of charge. When the computer determines that the second profile of charge is the same or substantially similar to the first profile of charge, the computer determines and records the second instant of time. The period of time corresponding to the difference in the initial instant of time and the second instant of time is a charge travel time between the two charge profile sensors. The computer calculates the charge velocity based on the pre-determined distance and the determined charge travel time. The computer compares the first and second profiles of charge using conventional correlation or cross-correlation techniques.

Figure 2:
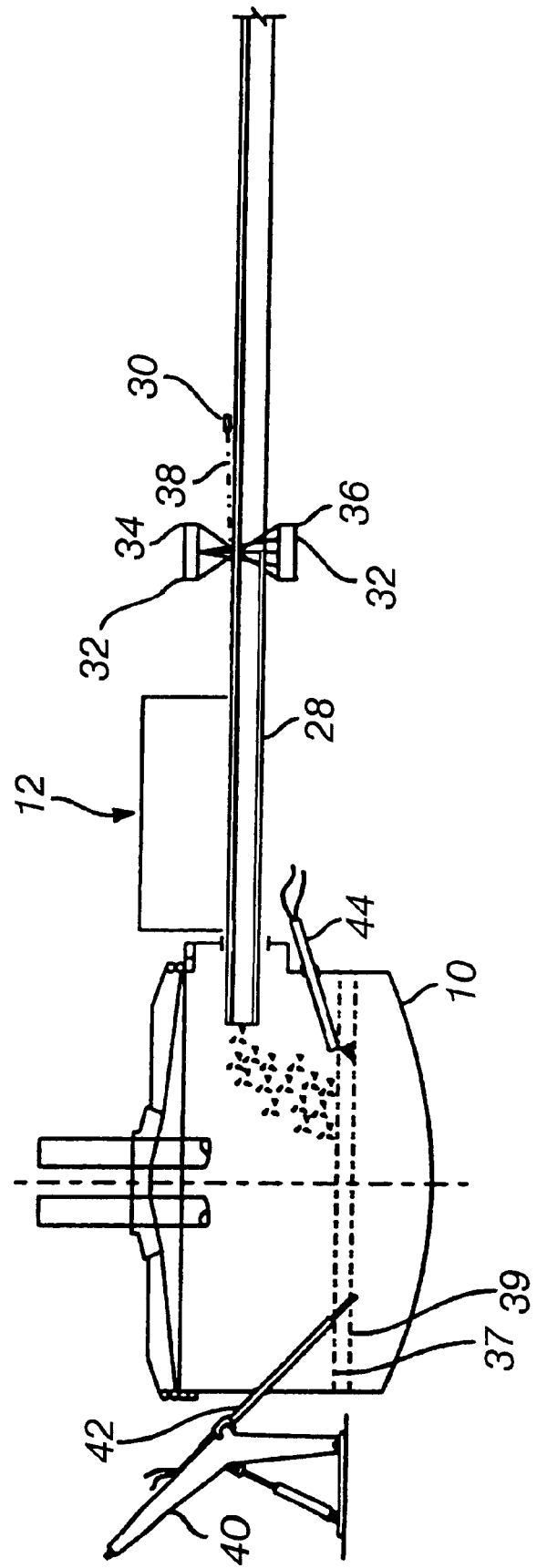
FIG. 2 is an elevational cross section of the apparatus of FIG. 1.

FIG. 2 is an elevational cross section of an apparatus for controlling the continuous steelmaking process in accordance with the present invention. A charge mass detector 32 is located upstream from the preheating chamber 12 and in view of the charge conveyor 28. The charge mass detector 32 has a radiation emitter 34 positioned over the conveyor surface. The emitted radiation may be absorbed or dispersed by the metallic charge and/or the conveyor. A radiation detecting receiver 36 is positioned underneath the conveyor bottom and vertically aligned with the radiation emitter 34 enabling the receiver 36 to measure the residual radiation from the emitter 34. The charge mass detector 32 determines an average charge mass based on the measured residual radiation.

A charge velocity detector 30 is also located upstream from the preheating chamber and in view of the charge conveyor 28. The charge velocity detector 30 is positioned over the charge conveyor 28 and at an angle down from horizontal to have an unobstructed line-of-sight 38 to the metallic charge. By activating the charge velocity detector 30 to obtain hits on crests of the moving metallic charge per unit of time, the charge velocity detector 30 determines an accurate metallic charge velocity towards the furnace 10.

In a preferred embodiment of the present invention, the computer (not shown) has input ports for receiving data (i.e., metallic charge mass and charge velocity) from the charge mass detector 32 and charge velocity detector 30. After receiving the metallic charge mass and charge velocity, a feed rate is determined by the computer. This feed rate is stored and updated in real time by the computer as metallic charge is loaded on the conveyor 28 and transported to the furnace 10.

After each tapping of the furnace 10, the steel bath level is determined. Metallic charge moves along the charge conveyor 28 towards the furnace 10 and deposits into the furnace 10 containing the steel bath 39 thereby contributing to the steel bath level. The steel bath 39 may have a foamy slag 37 covering the surface. The thickness and the consistency of the foamy slag 37 typically varies during the melting process as well as in different regions of the steel bath surface. The foamy slag 37 covering the steel bath surface complicates steel bath level measurement. Furthermore, without accurately knowing the steel bath level, obtaining the steel bath temperature which correctly reflects the temperature of the steel bath 39 by mechanized or thermal measurements is problematic. If the temperature is measured too close to the surface of the steel bath 39 or within the slag, the temperature indicated is inaccurate and does not reflect the correct temperature of the bath.

A probe holder 40 removably inserts a bath level probe 42 into the furnace 10 to detect the steel bath level. The bath level probe 42 is preferably automatically maneuvered through the wall of the furnace by the probe holder 40 to contact the steel bath 39. The bath level probe 42 comprises two graphite electrodes electrically connected to a potentiometer and voltage potential source and is used to measure the relative level of the steel bath 39 in the furnace 10. The probe holder 40 is electrically connected to the computer (not shown) and insertion of the bath level probe 42 is controlled by the computer. The tip of the bath level probe 42 is made of an insulating material that repels slag. A pre-determined DC voltage potential is applied across the electrodes forming an open circuit. The bath level probe 42 is then inserted through the slag 37 until the bath level probe makes contact with the steel bath 39. When the electrodes contact the steel bath 39, the steel bath creates an electrical connection between the electrodes and closes the circuit. During steel bath contact, the potentiometer indicates a voltage potential within a pre-determined DC voltage range based on the voltage potential applied. The computer then determines and stores the bath level based on pre-determined information (e.g., length of the probe and probe holder, angle of probe insertion and height of the probe). While the bath level probe 42 is in contact with the slag 37, the potentiometer indicates a much lower voltage potential, if any, in comparison to when the bath level probe 42 contacts the surface of the steel bath 39.

After the first determination of the steel bath level after tapping, the computer continuously predicts the steel bath level from one tapping to the next. The computer continuously predicts the bath level change based on the known geometry of the furnace 10, the steel bath level, the feed rate of metallic charge and the period of elapsed time after tapping. In an alternative embodiment of the present invention, the steel bath level is determined on demand in the manner described above.

Once the steel bath level is initially determined after tapping and stored by the computer, different measurements other than the bath level determination may be performed by a plurality of probes. After being placed on the probe holder 40, one of the plurality of probes may be positioned in the furnace 10 by the probe holder 40 with the same improved precision of results based on the determination of the steel bath level. One of the plurality of probes may be selected from the group comprising, but not limited to: a temperature probe, oxygen sensor, sampling probe, spectro-analysis sensor and carbon sensor. A temperature probe is preferably inserted to an optimal temperature measurement position, as determined by the computer, and the temperature of the steel bath is measured. In addition, based on the feed rate of the metallic charge and the determined steel bath level, the temperature probe may be withdrawn as the steel bath level rises. By consistently measuring temperatures at the optimal measurement position in the steel bath, accurate temperatures are obtained.

One or more lances selected from a plurality of lances may be used to inject materials or additives (e.g., oxygen or carbon) into the steel bath 39. The lances are removably positionable in the steel furnace 10 and automatically inserted through the furnace wall into the steel bath 39 or onto the surface of the steel bath. The lances are preferably inserted into the furnace and positioned at corresponding optimal positions determined by the computer based on the determined steel bath level and charge feed rate. At least one of the plurality of lances is an oxygen lance 44 that provides oxygen to the steel bath 39 for decarbonization and produces carbon monoxide. Based on the feed rate of metallic charge and the bath level, the oxygen lance nozzle is constantly maintained at a pre-determined distance from the steel bath level at all times during the cycles of the continuous steelmaking operation.

By controlling the injection of oxygen to maintain pre-determined concentrations of carbon, efficient use of energy is accomplished and steel of desirable carbon content is produced. In a preferred embodiment of the present invention, one oxygen lance and one carbon lance are used. However, the present invention may use multiple oxygen lances.

Figure 3:
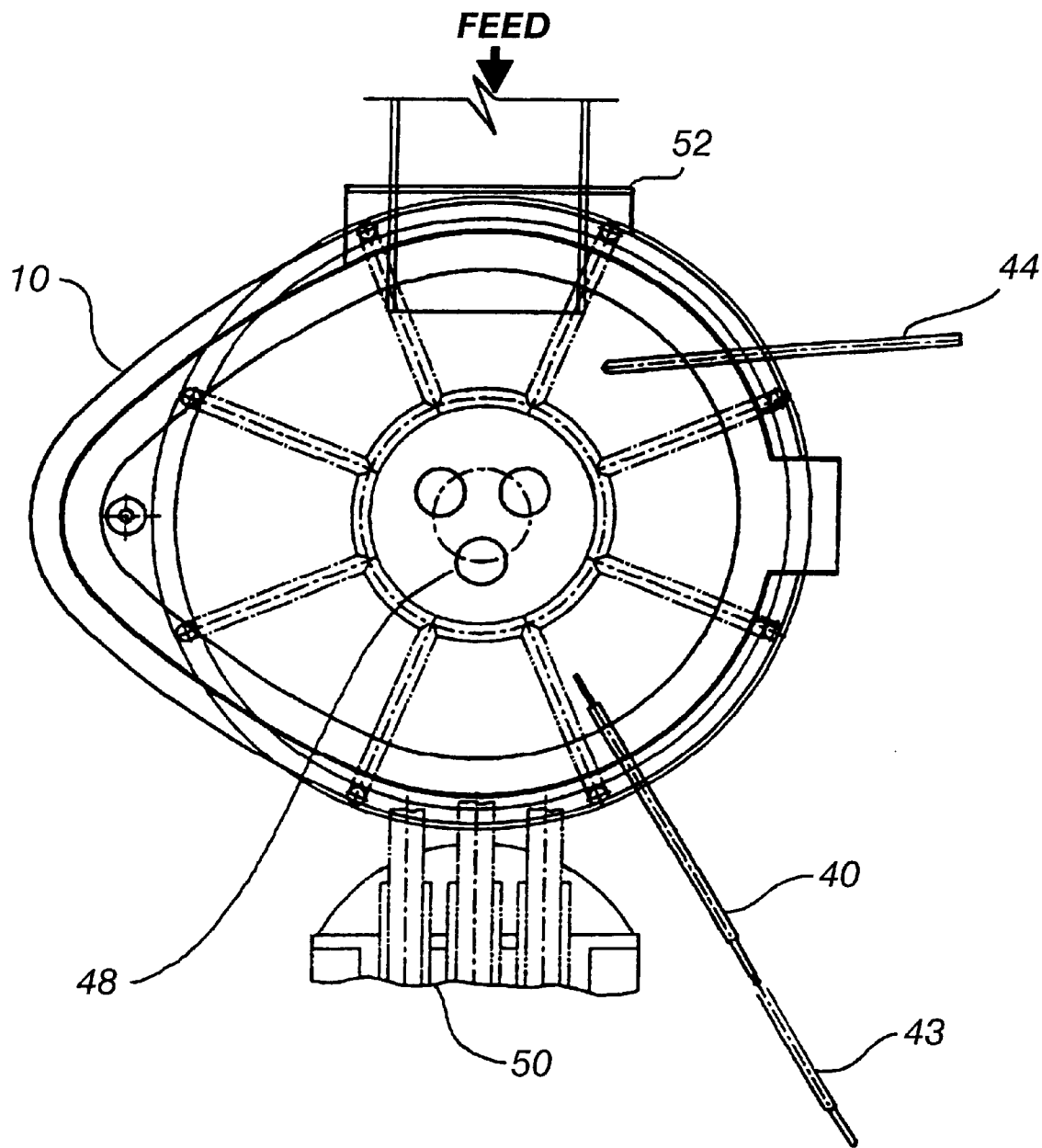
FIG. 3 is a horizontal cross section of an electric arc furnace in accordance with the present invention.

FIG. 3 is an enlarged plan view of the melting furnace of a portion of the invented apparatus showing positions of lances 44 and probes 43. An electric arc furnace 10 is preferably used to melt the metallic charge and produce a steel bath. The electric arc furnace 10 has a sealed roof structure that allows electrodes 48 to be raised or lowered into the furnace 10 and the steel bath contained within the furnace. The electrodes 48 are raised and lowered by an electrode support assembly 50. The electric arc furnace 10 has a furnace opening 52 to receive solid material feed from the connecting car.

A probe holder 40 is used to position the one of the plurality of probes 43 into the furnace 10 to determine steel bath level, temperature of the steel bath and oxygen content in the molten steel as well as to sample the molten steel. The oxygen lance 44 or oxygen lances is/are positioned at corresponding optimal position(s) as determined by the computer.

In operation, the computer acquires the mass and velocity of metallic charge introduced to the furnace by the conveyor from the feed rate detector. The feed rate detector measures the charge velocity of the metallic charge with the charge velocity detector. The feed rate detector also measures charge mass of the metallic charge with the charge mass detector. The computer determines the bath level of the molten metal in the furnace by detecting an electrical potential with a bath level probe and comparing the electrical potential to the pre-determined electrical potential range. If the detected electrical potential is within the pre-determined electrical potential range indicating contact with molten steel, then the computer calculates the bath level. The computer stores the bath level and calculates the feed rate of the metallic charge introduced to the furnace based on the mass and the velocity of the metallic charge. The feed rate may also be calculated before or during determination of the bath level but after the computer acquires the mass and velocity of the metallic charge. The computer predicts the new bath level based on the feed rate, the bath level, the geometry of the furnace and the period of elapsed time after tapping. The optimal positions for the probes and lances are determined by the computer based on the new bath level. The bath temperature is measured by the temperature probe that is placed on the probe holder and positioned at an optimal measurement position. Oxygen is injected into the bath by positioning the oxygen lance at an optimal oxygen injection position so that the oxygen lance is in the slag and in the direction of the bath circulation.

SUMMARY OF THE ACHIEVEMENT OF THE OBJECTS OF THE INVENTION

From the foregoing, it is readily apparent that I have invented an apparatus and method to improve control of the continuous steelmaking process in response to the feed rate of charge material and the bath level. The present invention accurately determines the steel bath level and determines the optimum feed rate of charge material. The present invention accurately determines the steel bath level of a steel bath covered with a foamy slag of unknown and varying thickness and consistency with a sensor. The present invention determines optimal positions of probes and lances in the steel bath. The present invention obtains accurate and reliable temperature measurements of the steel bath. Further, the present invention regulates oxygen injection into the steel bath. In summary, the method and apparatus of the present invention creates and maintains a homogenous steel bath.

It is to be understood that the foregoing description and specific embodiments are merely illustrative of the best mode of the invention and the principles thereof, and that various modifications and additions may be made to the apparatus by those skilled in the art, without departing from the spirit and scope of the invention, which is therefore understood to be limited only by the scope of the appended claims.

What is claimed is:

1. An apparatus for controlling a continuous steelmaking process wherein the process includes an electric arc steelmaking furnace for containing a molten steel bath and a conveyor connected to the furnace for introducing metallic charge to the interior of the furnace, said apparatus comprising:

a mass detector for determining a mass of the metallic charge introduced by the conveyor, said mass detector positioned in view of the conveyor, said mass detector comprising a radiation emitter and a radiation receiver, said radiation emitter positionable in view of the conveyor and irradiating the metallic charge on the conveyor, said radiation receiver positionable under the conveyor and detecting a residual radiation;

a velocity detector for measuring a velocity of the metallic charge introduced by the conveyor, said velocity detector positioned in view of the conveyor; and a bath level probe removably insertable in the furnace for continuously determining a steel bath level.

2. An apparatus according to claim 1 further comprising an oxygen lance removably positionable in the furnace for injecting oxygen into the steel bath.

3. An apparatus according to claim 1 further comprising a plurality of probes for measuring the temperature of the steel bath and for sampling the molten steel bath, said plurality of probes removably insertable in the furnace.

4. An apparatus according to claim 1 wherein said bath level probe comprises two graphite electrodes electrically connected to a potentiometer and a voltage potential source.

5. An apparatus for controlling a continuous steelmaking process comprising:

an electric arc steelmaking furnace for melting and refining metallic charge therein and for containing a molten steel bath;

a conveyor connected to said furnace for introducing metallic charge to the interior of said furnace;

a feed rate detector for measuring a mass and a velocity of the metallic charge introduced to said furnace, said feed rate detector positionable in view of the metallic charge introduced by said conveyor;

a computer electrically connected to said feed rate detector for determining a feed rate based on the mass and the velocity of the metallic charge;

a bath level probe removably positionable on the surface of the steel bath for detecting a steel bath level, said bath level probe comprising two electrodes insulated by slag-repelling material;

a temperature probe removably insertable into the steel bath for measuring a steel bath temperature; and a plurality of lances removably positionable in said furnace for injecting materials into the steel bath;

wherein said electrodes of said bath level probe are electrically connected to a potentiometer and a DC voltage source, wherein said potentiometer and said DC voltage source are electrically connected to said computer, and wherein said computer determines and stores the bath level when the measured electrical potential is within a pre-determined DC voltage range.

6. An apparatus according to claim 5 wherein said computer determines and stores a feed rate based on the mass and the velocity of the metallic charge, said computer determines and stores the steel bath level, said computer predicts future steel bath levels based on the steel bath level and the feed rate, and wherein said computer determines optimal positions based on the steel bath level to position the temperature probe and the plurality of lances.

7. An apparatus according to claim 5 wherein at least one of said plurality of lances is an oxygen lance for injecting oxygen into the steel bath, said oxygen lance removably positionable in the furnace by said computer; and wherein said computer maintains said oxygen lance at a constant, pre-determined distance from the steel bath.

8. An apparatus according to claim 5 wherein said feed rate detector comprises a mass detector for determining a mass of the metallic charge introduced by said conveyor and positionable in view of the metallic charge; and a velocity detector for measuring a velocity of the metallic charge introduced by said conveyor and positionable in view of the metallic charge.

9. An apparatus according to claim 8 wherein said mass detector comprises a radiation emitter and a radiation receiver, said radiation emitter for providing a pre-determined dose of radiation to the metallic charge on said conveyor, said radiation emitter positionable in view of said conveyor, said radiation receiver for detecting a residual radiation, said radiation receiver positionable under said conveyor.

10. An apparatus according to claim 8 wherein said velocity detector is a laser-based velocity detector.

11. An apparatus according to claim 8 wherein said velocity detector comprises:

a first charge profile sensor for detecting a first profile of the metallic charge introduced by said conveyor at an initial instant of time; and a second charge profile sensor for detecting a second profile of the metallic charge introduced by said conveyor at a second instant of time, said second charge profile sensor positioned a pre-determined distance from said first charge profile sensor;

wherein said first charge profile sensor transmits the first profile and the initial instant of time to said computer, and wherein said second charge profile sensor transmits the second profile and the second instant of time to said computer.

12. An apparatus for controlling a continuous steelmaking process wherein the process includes an electric arc steelmaking furnace containing a molten steel bath and a conveyor connected to the furnace for introducing metallic charge to the interior of the furnace, said apparatus comprising:

a mass detector for determining a mass of the metallic charge introduced by the conveyor, said mass detector positioned in view of the conveyor;

a laser-based velocity detector for measuring a velocity of the metallic charge introduced by the conveyor, said velocity detector positioned in view of the conveyor; and a bath level probe removably insertable in the furnace for continuously determining a steel bath level.

13. An apparatus according to claim 12 further comprising an oxygen lance removably positionable in the furnace and near the surface of the steel bath for injecting oxygen into the steel bath.

14. An apparatus according to claim 12 further comprising a plurality of probes for measuring the temperature of the steel bath and for sampling the molten steel bath, said plurality of probes removably insertable in the furnace.

15. An apparatus according to claim 12 wherein said mass detector comprises a radiation emitter and a radiation receiver, said radiation emitter positionable in view of the conveyor and irradiating the metallic charge on the conveyor, said radiation receiver positionable under the conveyor and detecting a residual radiation.

16. An apparatus according to claim 12 wherein said bath level probe comprises two graphite electrodes electrically connected to a potentiometer and a voltage potential source.

* * * * *